Aug. 25, 1964 R. W. WINBERG 3,146,027
AUTOMOBILE SEAT BELT DELAYED ACTION RELEASE
Filed July 20, 1962 2 Sheets-Sheet 1
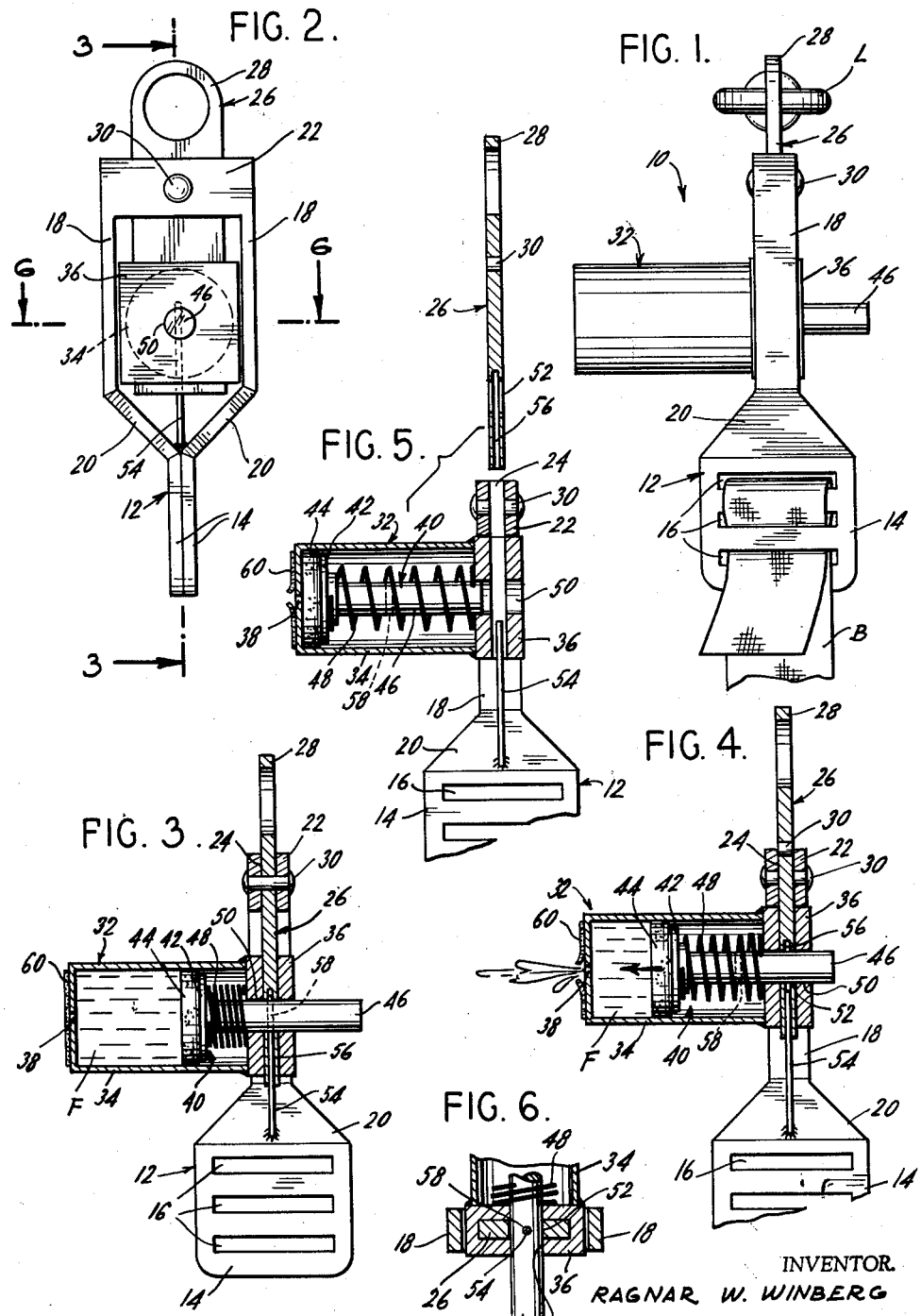
INVENTOR.
RAGNAR W. WINBERG
BY
Amster + Levy
ATTORNEYS Aug. 25, 1964

R. W. WINBERG 3,146,027

AUTOMOBILE SEAT BELT DELAYED ACTION RELEASE

Filed July 20, 1962

INVENTOR.
RAGNAR W. WINBERG
BY Ameter + Levy
ATTORNEYS

United States Patent Office 3,146,027
Patented Aug. 25, 1964

3,146,027
AUTOMOBILE SEAT BELT DELAYED
ACTION RELEASE
Ragnar W. Winberg, 115 W. Elder Ave.,
Floral Park, N.Y.
Filed July 20, 1962, Ser. No. 211,330
2 Claims. (Cl. 297—385)

The present invention relates generally to automotive safety equipment and particularly to a time-delay release mechanism for an automobile seat belt effective to automatically release the seat belt after a given period of time in response to a large increase in the tension force on the automobile seat belt.

Automobile seat belts have been known for some time and have been used successfully for the protection of automobile riders. Such devices have also been successfully employed in airplane uses and in other installations where it is desired to maintain a person seated in a given position within a vehicle. Although the advantageous functioning of seat belts intends that passengers will be held in position regardless of inertial shock which may result from collision or otherwise, it is desired that the belt be released after the inertial shock has passed. Normally, the release of the seat belt is easily accomplished by raising the handle in the manner well known in order to release the catch mechanism. However, during the trauma of an accident, it is often difficult to release the seat belt catch either because of mental or physical obstructions. It is, of course, extremely important that the restraining force of the seat belt be released in times of emergencies such that the passenger may easily remove himself, or be removed, from the vehicle. Therefore, it is desirable to provide a device which will automatically release the restraining forces of a seat belt within a relatively short period after an accident.

Accordingly, it is an object of the present invention to provide a delayed release mechanism for automotive safety belts. Specifically, it is within the contemplation of the present invention to provide a safety release mechanism in combination with a seat belt which operates after a predetermined time to release the safety belt in response to sharply increased tension forces on the seat belt.

It is further within the contemplation of the present invention to provide a seat belt construction including secondary release means which operate to release the seat belt, through a time-delay mechanism, after the occurrence of an accident.

In one illustrative embodiment of the present invention there is provided an automatic delayed release device for automobile safety seat belts. The device comprises a first member which may be secured to one portion of the seat belt assembly and a second member secured to another portion of the assembly. A delay release mechanism is provided including means interconnecting the first and second members and time delay means effective to release the interconnecting means after a predetermined time period. The time delay means are operative in response to an increase in tension forces between the first and second members.

The above brief description, as well as further objects, features and advantages of the present invention, will be best understood by reference to the following detailed description of one presently preferred embodiment when taken in conjunction with the accompanying drawings, wherein:

FIGS. 1 through 6 illustrate a first embodiment of the present invention and FIGS. 7 through 10 illustrate a second embodiment. Specifically:

FIG. 1 is a plan view of a safety time delay device according to the present invention;

FIG. 2 is a side elevational view device shown in FIG. 1;

FIG. 3 is a sectional view taken along the line 3—3 of FIG. 2, looking in the direction of the arrows, illustrating the mechanism in its normal position;

FIG. 4 is a sectional view similar to that of FIG. 3, illustrating the mechanism immediately after the delay release mechanism has been triggered;

FIG. 5 is a sectional view similar to FIGS. 3 and 4 illustrating the device in its released condition; and, FIG. 6 is a sectional view taken along the line 6—6 of FIG. 2 and looking in the direction of the arows.

FIG. 7 is a plan view, with portions shown in section, of a second embodiment of the present invention;

FIG. 8 is a sectional view taken along the line 8—8 of FIG. 7 looking in the direction of the arrows;

FIG. 9 is a view similar to that of FIG. 7 illustrating the device after the application of an abnormally high force; and, FIG. 10 is a view similar to those of FIGS. 7 and 9 illustrating the device at the end of the delay period with the mechanisms released.

Figure 8:
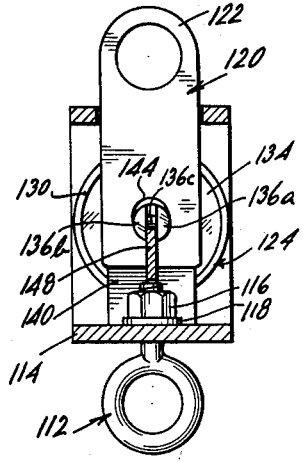
Figure 9:
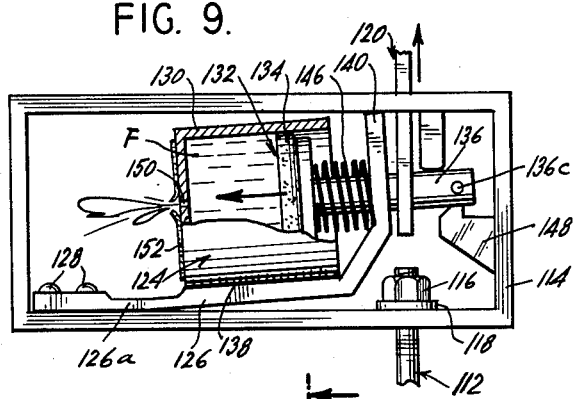
Figure 7:
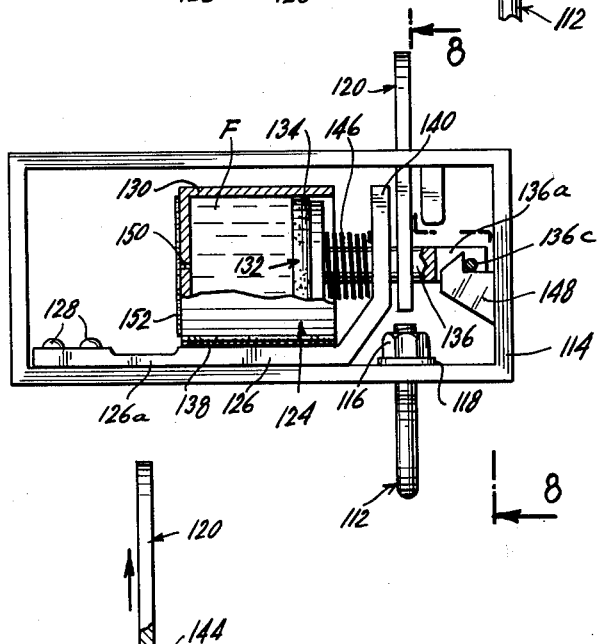

Referring now specifically to the drawings, there is shown in FIGS. 1 through 6 a delayed action seat belt release mechanism generally designated by the numeral 10. The device includes a first member 12 which is conveniently provided with a securement section 14 having a series of openings 16 for the securement of a standard automobile safety belt. A belt B is shown in FIG. 1 secured to the section 14. As may be best seen in FIG. 2, the first member is formed with a central opening defined by the separated arms 18, the angled connecting arms 20, and the cross member 22 which joins the separated arms 18. The cross member is formed with an opening 24 to receive the second member as described below.

A second member, generally designated by the numeral 26, is, in this illustrative embodiment, generally rectangular in shape and includes at one end a securement loop 28 which may be fastened to the hardware mounting the safety belt to the floor of the vehicle, such as the mounting lug L shown in FIG. 1, or, alternatively, may be secured to an adjacent section of the seat belt. Of course, the securement sections 14, 28 of the first and second members 12, 26, respectively, may be fashioned in any form convenient for the securement to and within the particular seat belt arrangement in which the device is to be installed.

The first member 14 and the second member 26 are interconnected by means which effectively join them together in the normal position illustrated in FIGS. 1 and 2 but which release the members from each other, after a period of delay, in response to the application of abnormally strong tension forces within the seat belt assembly. The second member 26 is normally positioned within the slot 24 formed in the cross bar 22 of the first member 12 with the greater portion of the second member 26 positioned between the arms 18. A rivet 30 mechanically interconnects the first member 12 and the second member 26 at the cross bar 22 and is effective to normally secure those members together. However, under the impact of abnormally high tension forces, the material forming the rivet fails and the rivet 30 is sheared such that the two members may move with respect to each other and such that the second member 26 may move outwardly from the slot 24. The size and material of the rivet 30 is selected such that it fails upon the application of higher than normal forces to the device 10.

In addition to the shearable rivet 30, further means are provided to interconnect the first and second members 12, 26. This further means includes the time-delay assembly 32 which is normally mounted upon the second member 26 and serves to interconnect that second member with the first member 12. The time delay mechanism or dash-pot 32 includes a piston housing 34 which is welded to its base 36 to form an enclosed fluid chamber. In the end wall of the housing 34 opposite from the base 36 there is provided an opening 38 of relatively small size for the slow release of fluid from the housing 34. Positioned within the housing 34, there is a piston assembly 40 which includes a piston 42, its associated washer 44 and a piston rod and securement member 46 connected to the piston 42. A compression coil spring 48 is positioned about the piston rod 46 and engages the top of the piston 42 at one end and the time-delay unit base 36 at the other end. The spring 48 serves to bias the piston 42 and piston rod 46 toward the end of the housing 34. An opening 50 is provided within the base 36 and is adapted to receive the piston rod and securement member 46. A complementary opening 52 is formed in the second member 26 and is similarly adapted to receive the piston rod and securement member 46. It will be appreciated that when the second member 26 is positioned within the first member 12, through the slot 24, and when the piston assembly 40 is moved to the right in the drawings, the securement member 46 effectively joins the second member 26 to the base 36 of the time-delay unit 32 and thereby joins the first member 12 to the second member 26 due to the position of the time-delay unit 12 within the confines of the first member 12.

A positioning pin 54 is secured to the first member 12 at the intersection of the angled arms 20 and extends along the axis of the first member 12 and is adapted to pass through a pin-receiving opening 56 in the end of the second member 26 and through a positioning opening 58 formed in the piston rod and securement 46. The normal position of the various mechanisms of the time-delay unit 32 and the related first member 12 and second member 26, are best seen in the sectional view of FIG. 3. The second member 26 is positioned in engagement with the first member 12 by securement within the slot 24 in the cross bar 22. In addition, the time-delay unit 32 is mounted in its position and secured to the second member 26 by the engagement of the base 36 with the end of the second member 26. The positioning pin 54 extends through the positioning opening 56 in the second member 26 and through the positioning opening 58 in the securement rod 46. The positioning pin is effective to maintain the piston assembly 40 adjacent the base 36 against the bias force exerted by the compression spring 48. A body of hydraulic fluid F is positioned within the cavity formed within the housing 34 and the escape opening 38 is covered with a thin membrane 60 to normally retain the fluid F within the housing 34. When pressure of the fluid F is increased, the membrane 60 will be easily ruptured as described below to slowly release the fluid F through the opening 38.

The operations of the mechanism 10 to effect an automatic delayed action release of a seat belt in response to a sharply increased tension applied across the device, will be best appreciated by considering the following description of the operations of the mechanisms. In FIG. 3, the various elements of the device 10 are shown in their normal positions. Tension is applied across the device by connection of the securement section 14 of the first member 12 and the securement loop 28 of the second member 12 to the appropriate cooperating portion of the seat belt assembly. Upon the application of an abnormally high force between the first and second members 12, 26, forces will be transmitted to the shearable pin 30 such that the material within the rivet 30 will fail and the second member 26 will move outwardly through the slot 24 from the first member 12 and occupy the position as shown in FIG. 4. Further movement will be prevented by engagement of the base 36 of the time delay unit 32 against the cross member 22 of the first member 12. Movement of the first member 12 with respect to the base 36 is prevented by the interengagement of the piston rod and securement member 46 through the opening 50 in the base 36 and the opening 52 in the first member 12.

The failure of the rivet 30 and the movement of the first member 12 and the time-delay unit 32 with respect to the first member 12 is effective to release the two-delay mechanism from its normal position as shown in FIG. 3. As the time-delay device 32 moves with respect to the first member 12, the positioning pin 54 is disengaged from the piston rod and securement member 46 such that the compression spring 48 may move the piston assembly 40 toward the closed end of the housing 34. This movement is not immediate due to the required displacement of the fluid F from the chamber within the housing 34. The displacement of the fluid F takes place through the opening 38 and the increased pressure upon the fluid, as a result of the movement of the piston assembly 40, is sufficient to rupture the thin membrane 60 which normally serves to maintain the fluid F within the housing 34. As the piston assembly 40 moves toward the end of the housing 34, the piston rod and securement member 46 is slowly withdrawn from the openings 50, 52 in the base 36 and first member 12 respectively. When the piston assembly 40 has moved completely to the end of the housing 34, the various elements are positioned as shown in FIG. 5 wherein the securement member 46 has been entirely withdrawn from the opening 52 in the second member 26 such that the second member 26 is completely free of the time-delay device 32 and, therefore, the first member 12. It will be appreciated that the above described movements will occur only upon the imposition on the device 10 of an extremely high tension force such as that which would occur in a collision. The time delay serves to maintain the seat belt device in its normally secured position for a set period of time but then automatically releases the seat belt to automatically release a passenger from confinement.

Referring now to FIGS. 7 through 10, there is shown a second embodiment of the present invention, generally designated by the numeral 110 which provides an identical function for a seat belt device. A first member 112, comprising an eye for securement to one portion of the seat belt assembly is secured to a frame 114 by means of a conventional nut 116 and washer 118. A second member 120 is provided with its securement loop 122 for attachment to a further portion of the seat belt assembly. The device 110 operates to normally maintain the first member 112 in rigid engagement with the second member 120 but provides for the automatic time-delayed release of such engagement upon the application of an abnormally high tension force between those two members. The second member 120 is normally secured to the first member 112 through the frame 114. A time-delay securement and release mechanism, generally designated by the numeral 124, is positioned within the frame 114 and is mounted upon a beam 126 which is secured by rivets 128 or otherwise to the frame 114. The device 124 includes a cylindrical housing 130 and a piston assembly 132 positioned therein. The piston assembly 132 includes a piston 134 and a piston rod and securement member 136. The housing 130 is welded to the mounting beam 126 as at 138 and the beam 126 has an upturned extension 140 at right angles to its mounting portion which is provided with an opening 142 through which is passed the piston rod and securement member 136. An opening 144 is provided within the body of the second member 120 and the securement rod 136 is received through this opening 144 to normally maintain the second member 120 in engagement with the frame 114 through the mounting beam 126.

Figure 10:
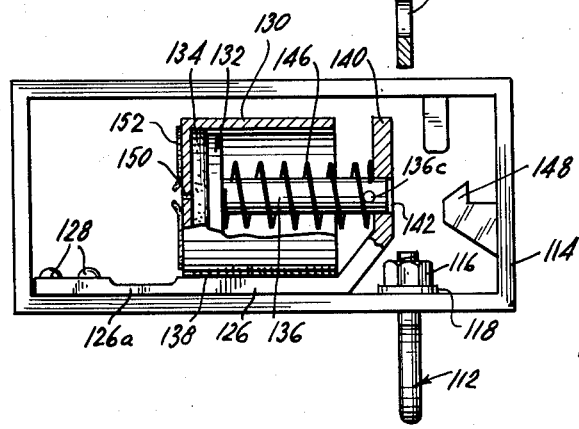

The delayed action securement and release mechanism 124 includes a compression spring 146 positioned between the piston 134 and the extension 140 of the beam 126 which biases the piston assembly 132 toward the left as viewed in the drawings. The bias force of the spring 146 tends to move the piston rod and securement member 136 toward the left through the openings 142, 144 thereby to release the second member 120. However, the securement rod 136 is provided with means to maintain it in position in opposition to the bias force of the spring 146. These means include the bifurcated arms 136a, 136b at the outer ends of the securement member 136 and the pin 136c which effectively joins the arms 136a, 136b. The pin 136c is normally engaged with a hook member 148 secured to the frame 114 to prevent the movement toward the left of the piston assembly 132. Upon the application of abnormal tension forces across the device 110, the mounting beam 126 will become elastically distorted at its reduced thickness section 126a adjacent the fastening elements 128. The distortion of the mounting beam 126 by forces applied to it through the securement member 136 enables the securement member 136 and specifically the pin 136c at the end of the member 136 to move upwardly with respect to the hook member 146 on the side of the frame 114. When tension between the first and second elements 112, 120 is sufficient to distort the frame 126 to the position shown in FIG. 9, the pin 136c is lifted upward and is disengaged from the hook member 148 such that the compression spring 146 may move the piston assembly 132 toward the left as indicated by the arrow in FIG. 9. A supply of fluid F is contained within the cylinder housing 130 and a small opening 150 is provided within the end wall of the housing 130 through which the fluid F may escape. A thin membrane 152 is disposed over the opening 150 and is normally effective to maintain the fluid F within the housing 130. However, upon the release of the piston rod and securement member 136, the movement of the piston assembly 132 increases the pressure of the fluid F sufficiently to rupture the member 152. As the fluid is slowly released through the opening 150, the securement member 136 is withdrawn from the opening 144 in the second member 120 such that the second member 120 may slide outwardly from its entry slot in the frame 114 and may be free from the frame 114 as shown in FIG. 10.

It will thus be appreciated that the second embodiment of the present invention, shown in FIGS. 7 through 10, provides a second illustrative device for the automatic delayed action release of a safety seat belt in response to the introduction of abnormal tension forces within the seat belt assembly. The utilization of such devices has particular advantage in situations wherein a passenger, after an accident, must make a fast exit from the vehicle in which he is positioned, which exit might be normally impaired to the confinement of the safety seat belt.

The above description and the drawings describe two embodiments of the present invention. However, other embodiments incorporating the invention may similarly be constructed. Therefore, the following claims should be construed broadly and in a manner consistent with the spirit and scope of the invention.

What I claim is:

1. In combination with a safety belt adapted to encircle the occupant of a vehicle and connected to the vehicle chassis, a delayed release connector including normally interconnected first and second members, interconnecting means between said first and second members, and a delay release mechanism secured to one of said members and normally having a connection to the other of said members and having tension measuring means and time-delay release means for automatically releasing said interconnection at the termination of a predetermined time period after a tension force of a predetermined amount is applied across said first and second members thereby to facilitate the egress of the occupant from the vehicle.

2. An automotive seat belt safety release device for automatically releasing an automotive seat belt assembly in response to an extreme increase in tension in said belt and after a predetermined interval of time following such increase in tension comprising a first member having attachment means for attachment to a first portion of said seat belt assembly, a second member having further attachment means for attachment to a second portion of said seat belt assembly, releasable securement means between said first and said second members, tension sensing means responsive to increases in tension in said seat belt assembly beyond a predetermined maximum level and operatively interconnected with said securement means for releasing same in response to an increase in tension beyond said predetermined point, and a time delay mechanism having a predetermined time delay period, said time delay mechanism operatively engaged with said securement means for preventing release of said securement means until the end of said time delay period, said securement means effectively releasing said seat belt assembly after the advent of extreme tension in said seat belt assembly and after said time delay period.

References Cited in the file of this patent

UNITED STATES PATENTS

| | | |
|---|---|---|
| Re. 23,981 | Stanley | Apr. 12, 1955 |
| 2,557,313 | Quilter | June 19, 1951 |
| 2,754,073 | Holm | July 10, 1956 |